July 28, 1959     G. PERIN     2,896,374
APPARATUS FOR HYDROCULTIVATION
Filed Sept. 27, 1957     2 Sheets-Sheet 1
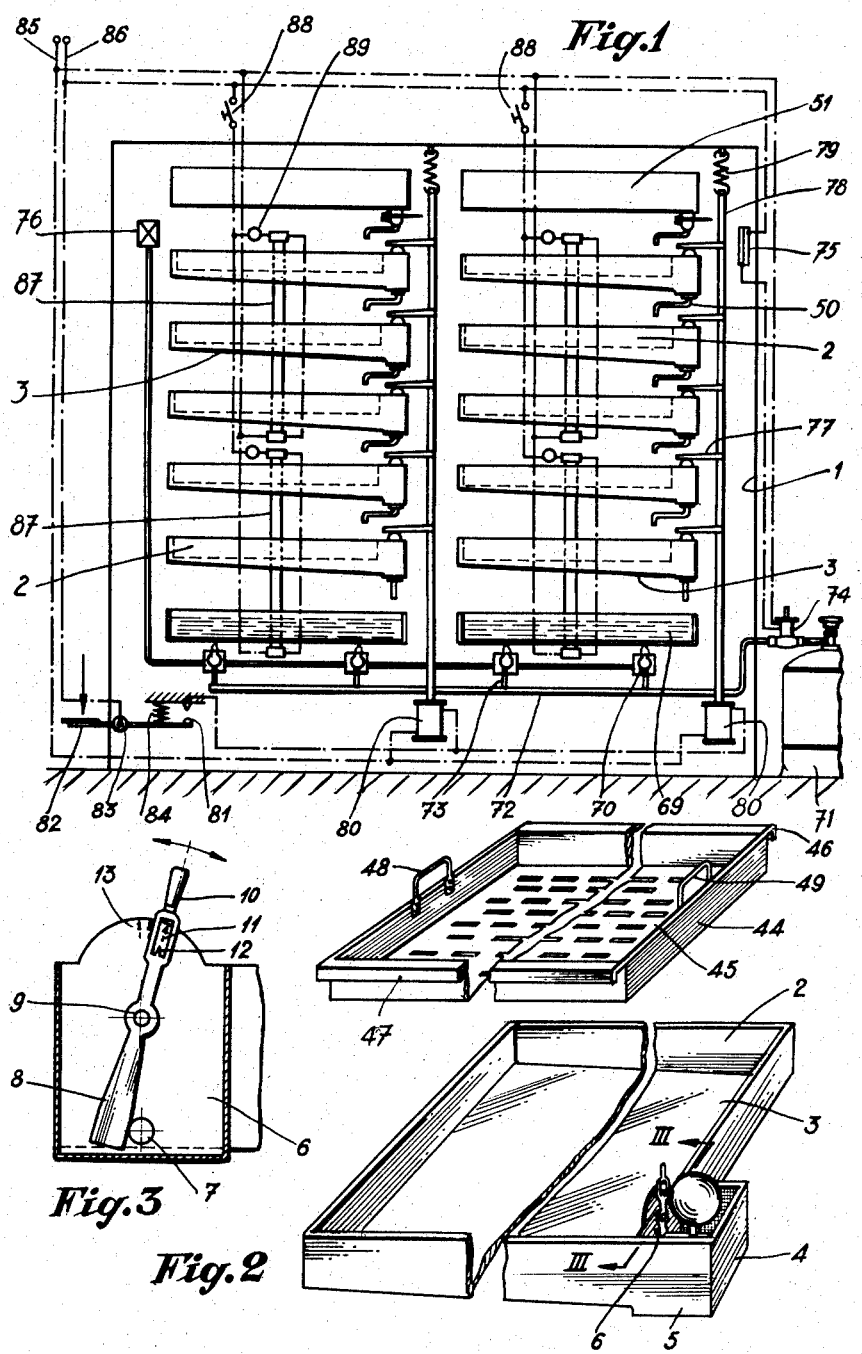
G. Perin, INVENTOR
PER Richards Geier
ATTORNEYS July 28, 1959     G. PERIN     2,896,374
APPARATUS FOR HYDROCULTIVATION
Filed Sept. 27, 1957     2 Sheets-Sheet 2
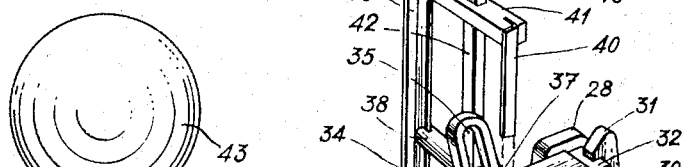
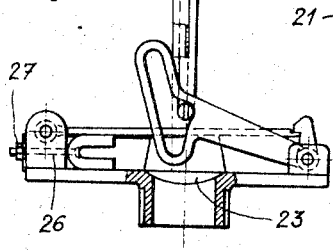
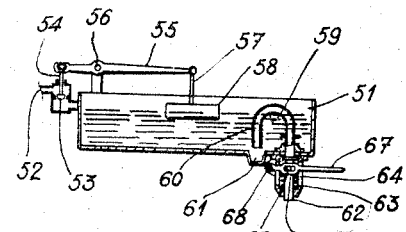
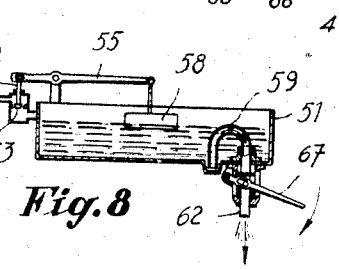
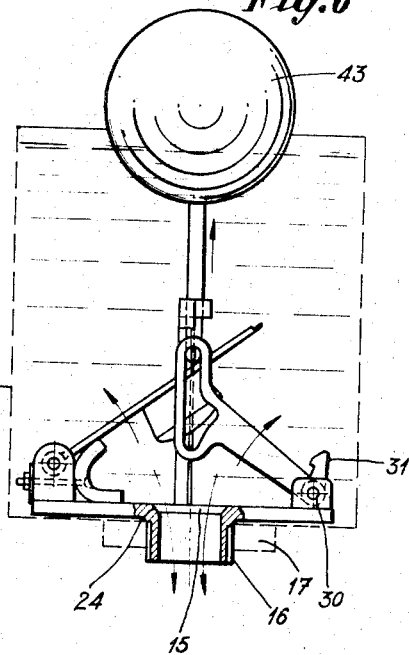
G. Perin, INVENTOR
PER Richards Geier
ATTORNEYS

United States Patent Office 2,896,374
Patented July 28, 1959

2,896,374
APPARATUS FOR HYDROCULTIVATION

Gaston Perin, Vaux-sous-Chevremont, Belgium, assignor to Leon Hippolyte Jules Van Eessel, Kappellen, Belgium Application September 27, 1957, Serial No. 686,647

Claims priority, application Belgium October 9, 1956

11 Claims. (Cl. 47—1.2)

The general principles of hydrocultivation or culture without earth, consist in putting germinated seeds periodically into contact with a nutritive solution.

It would however be quite erroneous to think, that these simple principles are easy to apply and that, without use of special devices, it is possible to obtain straight-away a good crop, secure against fungi and consisting of sound plants of constant quality.

The present invention concerns such a process of hydroculture but which is designed in a way which will do away with all hazards. This process is based on the experiments and on the results of research work carried out during many years by Mr. Gaston Perin.

The invention also concerns an equipment for applying systematically this process of hydroculture.

The process in question consists in the main in putting the sprouted seeds alternatively in an aqueous medium containing nutritive substances, and in a tropical atmosphere rich in carbon dioxide, whereby this treatment is applied in an enclosure which will preferably be subjected to constant illumination, either natural or artificial. The expression "tropical atmosphere" is to be understood to mean a warm atmosphere saturated with water vapor.

In a complementary way, the process consists in subjecting aforesaid sprouted seeds to the concomitant action of an aqueous medium flowing downward and containing nutritive substances, and of an upward current of warm air saturated with water vapor and containing a considerable amount of carbon dioxide.

In a further complementary way, the process consists in performing the whole operational cycle in an atmosphere and with an aqueous medium the temperature of both of which is practically constant. In order to fulfill these conditions implied in the new process, the highly diluted nutritive solutions are drawn from storage tanks located in the enclosure and the contents of which have stayed long enough therein to have reached a temperature which differs as little as possible from the temperature needed by the operational cycle; with the same object in view, the temperature and the moisture content at which the atmosphere inside the enclosure is kept, must be practically constant throughout the latter. For these reasons, the heating system, the moistening device and the generator of carbon dioxide shall preferably be combined in such way that, according to one of the principal characteristics of the invention, droplets are constantly drawn upward by the lifting power of the warm air, whereby aforesaid droplets, together with the warm air, carry-along the carbon dioxide in an upward direction so that, within the processing enclosure, the required tropical atmosphere is not only obtained with certainty, but is also perfectly adjustable and kept constant throughout, which is a primary condition for the reliability of the process.

An equally imperative requirement is that the various operational phases be conditioned with the same accuracy. In this respect, it is absolutely necessary for instance, that the germinated seeds and/or the plants be periodically and completely separated from the aqueous medium. As a result, the equipment must be fitted with a periodically acting emptying device of the processing tanks, this device being such that it will not only secure aforesaid periodic and systematic drainage, but also make possible a complete separation between the seeds and/or the plants, and the aqueous medium.

The realisation of these conditions, which are quite new in the field of hydroculture, have led to the design of a new equipment whose achievements are such, that now, for the first time, hydroculture may be faced without any hazard or risk in any part of the world.

The characteristic features of the process as well as of the equipment, are many and, without being restricted in any way to the particulars of the following description, will be clearly illustrated in the example given with full details below, with due reference to the appended drawings of which:

Figure 1 is a general schematic view of a hydroculture equipment applying the process of the invention;

Figure 2 is a perspective view of the two constitutive elements of a standardized processing unit, these two elements being called hereafter for facility's sake, cultivation tray and drainage trough respectively;

Figure 3 is a cross-section along line III—III of Figure 2;

Figure 4 shows a perspective view with partial cross-section of the mechanism controlling the outflow of the nutritive solution in each processing trough;

Figure 5 is a schematic front view with partial sectional view of the device according to Figure 4 in the closed position;

Figure 6 is a schematic front view with partial sectional view of the device according to Figure 4 in the open position;

Figures 7 and 8 are sketches representing schematically in their two characteristic positions, the feeding and drainage device of the storage tanks of the equipment.

In this particular example, the apparatus by means of which the new process according to the invention can be applied, mainly consists of an envelope or cabinet schematized in 1, preferably made of a frame built of an assembly of rigid elements which will generally be metal angle sections; onto this framework are mounted removable panels some or all of which are made of, or contain parts of a transparent material, aforesaid panels constituting the back, both lateral walls and the top of the cabinet; the front of the latter is made up of movable panels, which shall preferably be transparent, hinged at their lower edge so as to give access, individually, to each of the units contained in the cabinet. The inside of aforesaid cabinet is divided into compartments by adequate horizontal partitions, each compartment containing at least one processing unit comprising a cultivating tray and a drainage trough.

According to the invention, all processing units are strictly standardized. As shown schematically in Figures 2 and 3, each drainage trough 2 of prismatic shape comprises a slanting bottom 3 and a small auxiliary side trough 4 whose bottom 5 shall preferably be located slightly lower than the lowest part of aforesaid slanting bottom 3.

In the partition 6 between aforesaid troughs 2 and 4, an orifice 7 is provided whose opening is controlled by a shutter 8 pivoted at 9 and extending beyond that pivot into a control lever 10.

In this schematic example, this control lever is fitted with a window 11 and an index 12 moving in front of a graduated scale 13 fixed to aforesaid partition 6. The bottom of the auxiliary trough 4 comprises an orifice into which is engaged and/or fixed, the device controlling the drainage of the liquid medium as well as the time during which aforesaid liquid medium remains in the corresponding processing trough. This controlling device is thus of paramount importance.

According to the invention, it mainly consists of a base 14 fitted with an orifice 15 extending downward into a threaded neck 16 the outer diameter of which is practically the same as that of the opening fitted in the bottom of the auxiliary trough 4. Onto aforesaid neck 16 a nut 17 can be screwed, by means of which aforesaid regulating device can be firmly fixed to aforesaid auxiliary trough 4. Near one end of the base 14 are two small bearings 18—19 supporting a shaft 20; onto the latter, and between aforesaid bearings, is mounted one of the tubular ends 21 of a lever 22 on the lower face of which is fixed the plug 23 designed for closing hermetically the opening of neck 16 which is duly chamfered so as to constitute a seat 24. Next to aforesaid bearings 18—19, and below lever 22, an elastic retracting element is provided which, in the present instance, consists of a U-piece 25 of some elastic material such as rubber, fastened to aforesaid bearings by a bolt 26 and a nut 27. Near the other end of the base 14 there are also two small bearings 28—29 supporting a shaft 30 to the middle of which a pawl 31 is fixed for locking and liberating alternatively the free end 32 of aforesaid lever 22. Onto this same shaft 30 is also fixed an arm 33 the free end 34 of which is shaped with an opening 35 comprising a slope 36 and a catch 37. Into this opening is engaged a round cross-piece 38 whose ends are positively guided along two uprights 39—40 which form, together with an upper cross-piece 41, a rigid frame fastened to aforesaid base 14. Cross-piece 38 is fixed to the lower end of a rod 42 which glides easily through a hole in the upper cross-piece 41 and carries on top a float 43 which, in the present instance, is of spherical shape.

This combination is such that, when float 43 is in its lowest position, lever 22 applies firmly plug 23 onto its seat 24 and engages pawl 31 whose position is such that arm 33 acts as a catch for the moving assembly constituted by cross-piece 38, rod 42 and float 43.

Each auxiliary trough 4 is fitted with such a regulating device, so that the construction of all drainage troughs is strictly standardized. In each trough 2 is disposed or suspended a cultivating tray 44 whose prismatic shape and dimensions fit the drainage troughs 2; the bottom 45 of the cultivating trays is adequately perforated so as to allow the liquid medium to drain away, whilst retaining the seeds and the plants; two opposite edges of the cultivator trays are folded over to serve as hooks 46—47, whereas the two other opposite walls are fitted with handles 48—49.

The cultivator trays answering the above description can be placed or suspended straightaway into their respective drainage troughs 2, in such way that the perforated bottom 45 stands slightly higher than the highest level of the slanting bottom 3. The necks 16 are connected to a tube 50 bent twice at right angles so as to lead the liquid drained from one trough to an appropriate location of the underlying trough. In the example illustrated by Figure 1, the apparatus comprises, at each level, two processing troughs, but nothing prevents increasing the numbers or the dimensions of the latter. In any case, the processing units are stacked so as to let the liquid flow from one level to the next by gravity.

On top of each stack of processing units, there is a storage tank 51. These tanks shall preferably, as schematized in Figures 7 and 8, be connected straight to the water mains 52 through a constant-level device consisting, in this particular instance, of a valve 53 whose stem 54 is hinged at one end of a beam 55 which can swing about a pivot 56 and whose other end carries a float 58 freely suspended by a rod 57. The inlet of the water in aforesaid storage tank 51 is thus controlled by the float 58 which opens and closes alternatively valve 53. Preferably too, the process shall be timed in such way that a new adduction of liquid into the storage tank 51 shall take place as soon as the latter has been emptied. This means in other words, that the outflow tube must become inoperative as soon as the storage tank is empty. This can be achieved in various ways. In the example illustrated in Figures 7 and 8, this condition is fulfilled by a movable vertical siphon 59 whose shorter branch 60 is located over a recess 61 provided in the bottom of the storage tank 51. The longer branch 62 of this siphon extends through a small clack-box 63 containing a retracting spring 64; aforesaid branch 62 has a lateral spigot 65 engaged in the oblong opening 66 of a control lever 67 one end of which can swing about a fixed pivot 68. This device is designed in such way that the highest level in the storage tank 51, controlled by float 58, is lower than the priming level of the siphon. All that is needed to cause the storage tank 51 to empty automatically, is to pull-down the control lever 67, which lowers the siphon into the priming position. When lever 62 is released, its retracting spring brings back siphon 59 into its original position with the result that the drainage device is automatically put out of action as soon as the storage tank 51 is empty.

At the bottom of each stack of processing units, a device is provided for generating into the enclosure 1 the tropical atmosphere loaded with carbon dioxide. This device consists of at least one water tank 69 under which is fitted a series of burners 70 fed through pipes 72—73 and a mechanically driven valve 74 with any appropriate fuel, which in this particular instance is a gas cylinder 71. The valve in question is controlled by a thermostat 75 fitted in some adequate location inside the cabinet. On the other hand, the air/fuel mixture is controlled through a pilot device 76 sensitive to the carbon dioxide content of the atmosphere inside the enclosure, so that the production of carbon dioxide by aforesaid heating device stands under constant control. To this effect, recourse may be had to any known means consisting of a pilot device sensitive to carbon dioxide and of a thermojunction giving rise to an electric current which in turn controls the air inlets to the burners 70.

All the various regulating devices for the transfer of the liquid medium through the several processing units of a given stack, can be controlled simultaneously by a mechanical, pneumatic, hydraulic, oleo-pneumatic or other device. In this particular instance, a finger 77 is located above each float 43; all such fingers are fixed to a rod 78 which is permanently being pulled upward by a retracting spring 79, and occasionally downward by an electro-magnet 80. This electro-magnet 80, either singly or together with all similar electro-magnets 80 of the same apparatus, can be actuated through a pedal 82 swinging about a pivot 83 and held permanently open by a retracting spring 84.

The mechanically driven valve 74 and the electro-magnet 80 can be fed by an electric circuit schematized by the lead-in wires 85—86. The same electric circuit can also feed the luminescent lamps 87 via the switches 88 and the starters 89.

In applying the process according to the invention, this equipment works along the following lines: at the start, the upper storage tanks 51 have been filled with water to which has been added the necessary quantity of a nutritive substance in accordance with the nature and the amount of seeds to be cultivated. The food substances are products well known in plant biology; in the lower tanks 69, a certain amount of water has been introduced and the burners 70 have been lit. The lamps 87 have also been switched-on.

As a result of these preliminaries, the water in the lower tanks 59 is heated and partly evaporated, thus giving rise to a heating fluid which spreads uniformly through all parts of the enclosure and thus creating inside the latter real tropical conditions, i.e. a moist heat, whereby this atmosphere is moreover loaded with carbon dioxide which is being carried along by the droplets carried themselves by the warm air, due to the latter's own ascending power.

This results not only in the establishment of tropical conditions—required by the process according to the invention—but also raises the nutritive solution stored in the upper tanks 51, to the processing temperature. In each cultivator tray 44, a layer of germinated seeds has been poured over the perforated bottom. For starting the operational cycle, levers 67 are pushed down, thus causing the siphons 59 to prime automatically whilst returning immediately after to their original position.

The storage tanks 51 empty into the upper processing units. As soon as they have been emptied, they are refilled so that the water might have time to reach the processing temperature before the next operational cycle begins, which is a primary condition for the success of the process according to the invention.

The aqueous medium coming from the storage tanks thus flows into the first processing units located on top of the stacks and covers the germinated seeds contained therein. The water flows through opening 7 into the auxiliary trough 4 at a rate depending on the position of shutter 8, so that the water level in auxiliary trough 4 rises uniformly at a predetermined rate. At the start, the float-controlled drain plug of auxiliary trough 4 is in the closed position as shown in Figures 4 and 5. When the liquid has reached a predetermined level in auxiliary trough 4, float 43 exerts a comparatively strong pull on the arm 33 which is thus moved upward, causing shaft 30 and pawl 31 fixed to the latter to rotate; the displacement of this pawl disengages lever 22 which is rapidly pushed upward by the elastic element 25, thus lifting plug 23 and liberating opening 15. This arrangement determines with almost mathematical precision the time during which the germinated seeds and/or the plants contained in a processing tray will remain partially or totally immersed in the nourishing solution. The latter then flows by gravity into the next lower unit, and so on. The net result is, that the seeds or plants will alternatively be immersed in and separated from the nutritive solution under perfectly timed conditions.

When the nutritive solution has been drained from the lowest unit in each stack, the operational cycle comes to an end and needs only be repeated as often as necessary for attaining the desired growth of the plants. To this effect, all float-controlled devices are returned to their closing position. In this particular instance, this will be done by pressing down pedal 82 for closing contact 81 and energizing all electro-magnets 80. The rods 78 are thus pulled downward and each finger 77 pushes on the corresponding float 43. All devices are thus brought back into the closed position; as soon as pedal 82 is released, the electro-magnets 80 are de-energized and the retracting springs 79 bring back the fingers into their stand-by position.

If the temperature of the atmosphere in enclosure 1 should vary, the thermostatic device 75 brings the mechanically driven valve 79 into action in the well known way, thus controlling the rate of flow of the fuel to the burners 70 and the amount of heat generated by the latter; any variations in the carbon dioxide content of the atmosphere inside the enclosure are similarly controlled by the pilot device 76 which changes the composition of the air/fuel mixture fed to the burners 70, thus increasing or decreasing the amount of carbon dioxide generated.

As the storage tanks 51 are automatically refilled, it would also be possible to introduce into the latter the necessary amount of nutritive substance; another possibility would be to connect them straight to a big reservoir filled with nutritive solution, instead of connecting them to the water mains. Similarly, each new operational cycle could be started automatically either by a timing device or by a device controlled by the flow of nutritive solution through the last processing unit in each stack. It would thus become easy to provide for a completely automatic processing from the moment the germinated seeds are deposited into the trays, to the removal of the plants.

Attention must be called once more to the fact that all trays, draining troughs and float-controlled regulating devices for the successive transfers of the nutritive solution, are strictly standardized.

It is obvious that such hydroculture apparatus according to the invention can be built for any capacity with those same standard units and devices, as any number of such units and devices can be assembled and fed by the same sources which supply the water, the fuel and the electric current respectively.

In order to make the equipment as well as the process suitable for being applied in any part of the world, the heating device connected with the apparatus may be provided for burning any kind of fuel, either solid, liquid or gaseous.

The present invention thus covers the actual process as well as the apparatus, in whichever way the latter may be applied, and also any characteristic parts used in the construction of this new apparatus, whereby such characteristic parts are as described above and illustrated by the appended drawings, or any equivalent parts fulfilling equivalent functions.

What I claim is:

1. Apparatus for the application of the process for hydroculture comprising means forming at least one closed space divided into superposed compartments; in each compartment at least one processing unit consisting of a cultivation tray and a drainage trough; adjacent to each drainage trough, an auxiliary trough of small capacity, containing a device for regulating the flow of liquid medium; under each stack of processing units, a device for generating a tropical atmosphere loaded with carbon dioxide, consisting of at least one trough containing water, a heating device for aforesaid trough, which heating device also constitutes a generator of carbon dioxide; on top of each stack of processing units, a storage tank containing a nutritive solution, and in combination with aforesaid storage tank, a device for automatically refilling these tanks as soon as they have been emptied, wherein the drainage troughs being of prismatic shape with a slanting bottom are fitted, at the lowest level of said slanting bottom, with the said small auxiliary trough comprising a device for controlling the outflow of the liquid medium, whereby the partition between aforesaid draining trough and aforesaid auxiliary trough is provided with at least one orifice whose opening is controlled by a shutter with indicator sight, all processing units being strictly standardized for all installations.

2. Apparatus according to claim 1, characterized by the fact that the shutter controlling the communication orifice between the drainage trough and the auxiliary trough is mounted on a pivot and extends beyond this pivot into a lever carrying an index movable in front of a graduated scale fitted to the corresponding part of the partition between both troughs, so as to constitute an indicator on which the free section of the water passage from the drainage trough to the auxiliary trough can be read at any time.

3. Apparatus according to claim 1, characterized by the fact that the bottom of the auxiliary trough is lower than the lowest part of the slanting bottom of the drainage trough.

4. Apparatus according to claim 1, characterized by the fact that the cultivation tray with perforated bottom is bent-over on two opposite edges so that it might be suspended into aforesaid drainage trough, whereby the design is such that aforesaid perforated bottom is maintained at a slight distance above the slanting bottom of aforesaid drainage trough.

5. Apparatus according to claim 1, wherein the device which controls the outflow of the liquid medium in each processing unit comprises a plug attached to a lever engaged by a pawl fixed onto a shaft to which is also fixed an arm shaped in such way that it can maintain a float, whereby aforesaid lever engaged by the pawl is raised into the position in which the plug is lifted from its seat, by at least one elastic element, a base plate which carries near one end a pair of bearings for supporting the shaft of said lever to which is attached the actual drainage plug, whereas the base-plate carries near the opposite end another pair of bearings for said shaft to which are fixed said pawl and said arm, the free end of which arm is built into a slot of special shape engaging a cross-piece fastened to the stem of the float.

6. Apparatus according to claim 1 comprising a mechanism or closing simultaneously all float-controlled devices which secure the transfer from the liquid medium from one processing unit to the next, at least within the same stack, mainly consists of a vertical rod carrying a set of lateral fingers each of which is right on top of a float, whereby the vertical rod is permanently held in its upper position by an elastic retraction element, whilst it can also be brought intermittently into its lower position by a device.

7. Apparatus according to claim 6, characterized by the fact that the vertical rod or rods carrying the control-fingers which hold the floats down, are designed in such way, that they constitute the armature of an electromagnetic device whose circuit is controlled by appropriate means, such as a pedal.

8. Apparatus according to claim 1, characterized by the fact that the storage tanks located on top of the stacks of processing units, are equipped with a contast level device and with an emptying device which is automatically closed and put out of action when the storage tank has been emptied, whereby provision has been made for automatically refilling aforesaid storage tanks either with water or with nutritive solution immediately after they have been emptied.

9. Apparatus according to claim 8, characterized by the fact that the inflow of the aqueous medium into the storage tanks is controlled by a mechanism comprising a float, whereas the outflow of aforesaid aqueous medium is controlled by a device comprising a siphon which can be displaced vertically.

10. Apparatus according to claim 1, characterized by the fact that the heating device is at least one burner whose fuel is fed to the burner through a mechanically driven valve which is itself controlled by at least one thermostatic device located in the processing enclosure, in order to maintain a comparatively constant temperature inside the latter throughout the operational cycles.

11. Apparatus according to claim 1, characterized by the fact that the carbon dioxide content of the atmosphere inside the enclosure is controlled by a pilot device which acts on the generator of carbon dioxide and on the composition of the air/fuel mixture of the heating device.

References Cited in the file of this patent

UNITED STATES PATENTS

| 1,038,407 | McFarlin | Sept. 10, 1912 |
| 2,141,478 | Lund | Dec. 27, 1938 |
| 2,145,052 | Lund | Jan. 24, 1939 |
| 2,169,701 | Lund | Aug. 15, 1939 |
| 2,208,785 | Armstrong | July 23, 1940 |
| 2,725,673 | Perin | Dec. 6, 1955 |

FOREIGN PATENTS

| 1,083,569 | France | June 30, 1954 |
| 473,279 | Great Britain | Oct. 4, 1937 |
| 478,403 | Great Britain | Jan. 18, 1938 |
| 744,200 | Great Britain | Feb. 1, 1956 |
| 195,248 | Switzerland | Apr. 1, 1938 |